United States Patent Office 3,671,387
Patented June 20, 1972

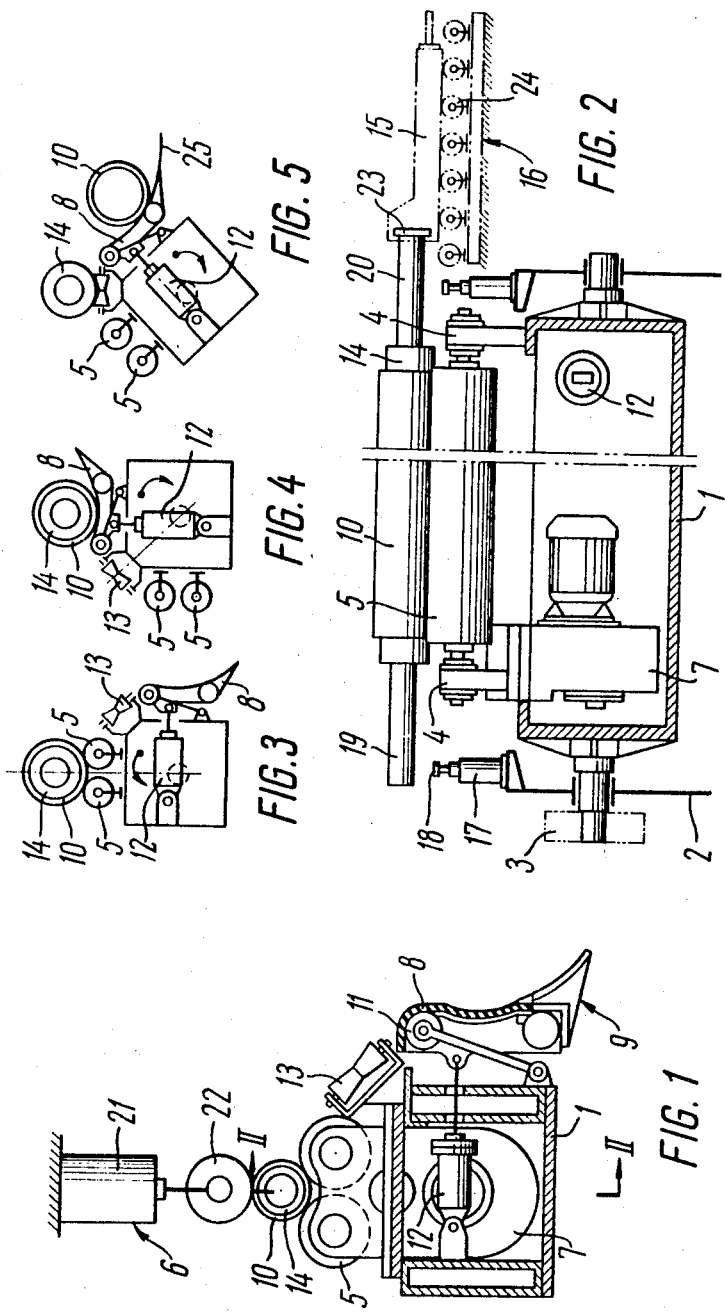

3,671,387
UNIT FOR CALENDERING PIPES AND EXTRACTING CORES THEREFROM IN A MACHINE FOR PRODUCING FIBROCEMENT PIPES
Isaak Pavlovich Abardovsky, 3 Pryadilnaya ulitsa 8, kv. 24, and Lev Alexandrovich Gertsman, 1 Dmitrovsky proezd 6, korpus 1, kv. 95, both of Moscow, U.S.S.R.
Filed Aug. 14, 1969, Ser. No. 850,106
Int. Cl. B31c *1/00, 3/00*
U.S. Cl. 162—284
6 Claims

ABSTRACT OF THE DISCLOSURE

A machine for producing fibrocement pipes comprises an apparatus for calendering pipes and for extracting a core therefrom including a beam having a longitudinal axis and pivotable about the axis in opposite directions. Driven rollers of a calendering mechanism are mounted on the beam, and an undriven calendering roller is mounted adjacent the beam to calender a pipe supported on the driven rollers. After calendering of the pipe, the beam is pivoted to a position in which a pivotal chute on the beam can receive the calendered pipe, a lever system being coupled to the support chute to oscillate the same. An extractor head removes the core from the calendered pipe when the pipe is supported in the chute whereafter the beam undergoes reverse rotation and the calendered pipe is removed from the chute. The beam is then rotated to a position in which the core is returned to the beam and supported by biconical rollers on the beam whereafter the core is removed and the beam is further rotated to initial position.

---

The present invention relates to machines for producing fibrocement pipes and more particularly to a unit for calendering pipes and for extracting a core therefrom.

In known machines for producing fibrocement pipes, there is a unit for calendering the pipes and for extracting a core therefrom comprising mechanisms for calendering the pipes, for supporting the pipes with respect to the core, and a mechanism for extracting the core from the pipes, all said mechanisms being interconnected by a transporting means that ensures consecutive transfer of the cores with pipes from one mechanism to another and the return of free cores to the presser set.

The performance of operations in such systems is associated with considerable translatory motion of the cores with the pipes and alone along said mechanisms of the entire unit, which involves extra expenditures of time.

Moreover, a disadvantage of such as system for calendering pipes and extracting cores therefrom resides in difficulties encountered in accommodating the units, since they require considerable floor space.

The present invention seeks the elimination of the disadvantages inherent in the known units adapted for calendering pipes and extracting cores therefrom.

A specific object of the present invention is to provide a unit in which the translatory motion of the cores along all the mechanisms of the unit is avoided.

This object is accomplished in that in a machine for producing fibrocement pipes, the unit for calendering the pipes and extracting the core therefrom, includes a calendering mechanism, a mechanism for supporting the calendered pipe and a mechanism for extracting the core from the supported pipe, and according to the invention, driven rollers of the calendering mechanism and also a chute of the pipe-support mechanism are arranged on a beam turnable in opposite directions relative to its longitudinal axis, the chute being associated with the beam through the intermediary of a driven link system which imparts oscillatory motion to the chute. Between the chute and the driven rollers of the calendering mechanism there is arranged a means for receiving the free core from the working head of the mechanism for extracting the core from the pipe.

The means for receiving the free core from said working head essentially comprises a system of biconical rollers.

The drive means of the rollers of the calendering mechanism may be accommodated within the interior of the turnable beam.

Given hereinbelow is a detailed description of a specific embodiment of the present invention in conjunction with the accompanying drawings.

In the drawings:

FIG. 1 is a cross-sectional view of a unit for calendering pipes and extracting a core from the pipe for use in a machine to produce fibrocement pipes, according to the invention;

FIG. 2 is a section taken along line II—II of FIG. 1; and

FIGS. 3, 4 and 5 diagrammatically represent the same unit in different working positions.

The unit for calendering pipes and for extracting a core therefrom, according to the present invention, comprises a hollow beam 1 turnable about the longitudinal axis thereof and mounted in bearings on a bed 2 of the machine. The beam 1 can be turned in opposite directions by a drive 3.

Arranged on the beam 1 in bearings 4 (FIG. 2) are driven support rollers 5 of a calendar 6; said rollers are driven in rotation from a drive 7 accommodated inside the beam 1.

Mounted adjacent to the rollers 5 of the calender 6 on the beam 1 is a chute 8 of a mechanism 9 for supporting a calendered pipe 10, said chute 8 being arranged on one side of the beam along the longitudinal axis of said beam. The chute 8 is coupled with the beam 1 through the intermediary of a lever system 11 (FIGS. 1, 3, 4, 5) which is actuated by hydraulically operated cylinder 12 (FIG. 2); the lever system 11 imparts oscillatory motion to the chute 8.

Disposed between the rollers 5 of the calender 6 and the chute 8 on the beam 1 is a row of biconical rollers 13 that serve for receiving a free core 14 from a working head 15 (FIG. 2) of a mechanism 16 adapted to extract the core from the pipe 10.

Mounted on the machine bed 2 are hydraulic jacks 17, provided with crosspieces 18 onto which the core 14 is placed by means of its journal ends 19 and 20.

The unit of the present invention operates as follows.

The core 14 with the pipe 10 wound thereon is placed on the crosspieces 18 of the hydraulic jacks 17 whose rods are in the extreme upper position.

The core with the pipe may be placed on the crosspieces by any conventional mechanism suitable for the purpose.

When the rods of the hydraulic jacks 17 are lowered, the core 14 with the pipe 10 will descend onto the driven rolls 5 of the calender 6 (FIG. 3).

The hydraulic cylinder 21 of the calender 6 lowers a non-driven roller 22, and the calendering process commences (FIG. 1).

On completion of the process of calendering, the hydraulic cylinder urges the roller 22 upwards, and the hydraulic jacks 17 slightly lift the core 14 with the pipe 10. The drive 3 turns the beam 1 through 90° counterclockwise (FIG. 4), and thereby the mechanism 9 for supporting the calendered pipe 10 is brought thereunder.

As the rods of the hydraulic jacks 17 are lowered, the core 14 and pipe 10 will descend onto the chute 8 of the mechanism 9; collar 23 of the journal 20 of the core 14 will enter a groove of the working head 15 of the mechanism 16 for extracting the core.

The lever system 11 driven by the hydraulically-operated cylinders 12 supports the weight of pipe 10 on the chute 8 thereby reducing the pressure of the pipe 10 on the core 14, and, by moving the working head 15 of the mechanism 16 to the right (FIG. 2), the core 14 is extracted from the pipe 10 and is brought onto rollers 24 of the mechanism 16.

With the beam 1 turned clockwise through 45° from the position in FIG. 4, the pipe 10 is transferred onto an inclined surface 25, along which it is delivered for further operations, and the row of biconical rollers 13 approaches the level of the row of the rollers 24 of the mechanism 16 (FIG. 5).

As the working head 15 of the mechanism 16 moves to the left (FIG. 2), the core 14 is transferred from the rollers 24 of the mechanism 16 onto the rollers 13 mounted on the turnable beam 1.

When the crosspieces 18 of the hydraulic jacks 17 travel upwards, they will lift the free core 14 from the rollers 13 and said core may be then removed therefrom by any appropriate mechanism which is not described herein, since it is not germane to the present invention.

By turning the beam 45° clockwise from the position of FIG. 5, the mechanism is returned to its initial position.

What is claimed is:

1. In a machine for producing fibrocement pipes, an apparatus for calendering pipes and extracting a core therefrom, said apparatus comprising a beam having a longitudinal axis, means for pivoting said beam about said axis in opposite directions, a calendering mechanism including driven rollers mounted on said beam and an undriven calendering roller mounted above said beam to calender a pipe supported on the driven rollers, jack means fixedly supported adjacent said beam to hold the pipe after calendering thereof while the beam is pivoted, means coupled to said beam for rotation therewith to a position in which it can receive the calendered pipe and including a pivotal support chute for the calendered pipe, a lever system coupled to said support chute to oscillate the same, and a drive means for said lever system, means for extracting a core from the calendered pipe when the pipe is supported in said chute whereafter the calendered pipe is removed from the chute, and means mounted on said beam between the driven rollers and said chute for receiving the extracted core after the beam has undergone rotation from the position in which the core was extracted from the calendered pipe and the pipe has been removed from the chute.

2. Apparatus as claimed in claim 1 wherein said means for receiving the extracted core comprises a row of biconical rollers.

3. Apparatus as claimed in claim 1 wherein said beam is hollow and comprising a drive means for said driven rollers mounted in the interior of said beam.

4. Apparatus as claimed in claim 1 wherein said chute is positioned on said beam so that when said beam is pivoted in one direction, the chute is located to receive the calendered pipe and said means which receives the extracted core is positioned on said beam so that when said beam is pivoted in the opposite direction the means which receives the extracted core is positioned to receive said core.

5. Apparatus as claimed in claim 4 wherein drive rollers are positioned on said beam so that when said beam is pivoted further in said opposite direction said drive rollers are located in their initial position, said jack means beng operative to hold said core and permit removal thereof so that the beam can be pivoted further to bring the drive rollers to their initial position.

6. Apparatus as claimed in claim 5 wherein said jack means comprises a pair of axially spaced jacks located at opposite ends of said beam.

References Cited

UNITED STATES PATENTS

| 1,064,741 | 6/1913 | Jones | 25—30 A |
| 2,292,866 | 8/1942 | Cann | 25—30 R |
| 2,374,086 | 4/1945 | Ferla | 162—284 X |

S. LEON BASHORE, Primary Examiner

A. D'ANDREA, JR., Assistant Examiner

U.S. Cl. X.R.

25—30 R, 30 A; 162—120, 122